United States Patent
Goodwin, III et al.

(10) Patent No.: US 7,222,184 B2
(45) Date of Patent: May 22, 2007

(54) METHOD OF DOWNLOADING WEB CONTENT TO A NETWORK KIOSK IN ADVANCE

(75) Inventors: John C. Goodwin, III, Suwanee, GA (US); John Brian Francis, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 715 days.

(21) Appl. No.: 09/727,334

(22) Filed: Nov. 29, 2000

(65) Prior Publication Data

US 2002/0065931 A1 May 30, 2002

(51) Int. Cl.
G06F 15/16 (2006.01)
(52) U.S. Cl. ............... 709/232; 709/219
(58) Field of Classification Search ........... 709/203, 709/223, 224, 218, 227, 244, 217, 219, 213, 709/231, 245, 200, 232, 225; 707/10, 203, 707/101, 100; 705/14, 1; 455/3.15; 463/29; 713/100; 345/733; 717/178; 715/501
See application file for complete search history.

(56) References Cited

U.S. PATENT DOCUMENTS

| | | | | |
|---|---|---|---|---|
| 5,572,643 A * | 11/1996 | Judson | | 709/218 |
| 5,950,173 A * | 9/1999 | Perkowski | | 705/26 |
| 5,959,945 A * | 9/1999 | Kleiman | | 381/81 |
| 5,961,591 A * | 10/1999 | Jones et al. | | 709/217 |
| 6,011,537 A * | 1/2000 | Slotznick | | 345/733 |
| 6,041,360 A * | 3/2000 | Himmel et al. | | 709/245 |
| 6,157,930 A * | 12/2000 | Ballard et al. | | 707/203 |
| 6,157,935 A * | 12/2000 | Tran et al. | | 715/503 |
| 6,199,068 B1 * | 3/2001 | Carpenter | | 707/100 |
| 6,199,204 B1 * | 3/2001 | Donohue | | 717/178 |
| 6,233,606 B1 * | 5/2001 | Dujari | | 709/213 |
| 6,268,856 B1 * | 7/2001 | Bruck et al. | | 715/501.1 |
| 6,272,493 B1 * | 8/2001 | Pasquali | | 707/10 |
| 6,302,795 B1 * | 10/2001 | Ito | | 463/29 |
| 6,321,265 B1 * | 11/2001 | Najork et al. | | 709/224 |
| 6,345,256 B1 * | 2/2002 | Milsted et al. | | 705/1 |
| 6,438,592 B1 * | 8/2002 | Killian | | 709/224 |
| 6,442,529 B1 * | 8/2002 | Krishan et al. | | 705/14 |
| 6,549,912 B1 * | 4/2003 | Chen | | 707/104.1 |
| 6,594,692 B1 * | 7/2003 | Reisman | | 709/219 |
| 6,597,891 B2 * | 7/2003 | Tantawy et al. | | 455/3.05 |
| 6,609,146 B1 * | 8/2003 | Slotznick | | 709/200 |
| 6,609,253 B1 * | 8/2003 | Swix et al. | | 725/88 |
| 6,615,274 B1 * | 9/2003 | Achtermann et al. | | 709/244 |
| 6,647,417 B1 * | 11/2003 | Hunter et al. | | 709/225 |
| 6,711,617 B1 * | 3/2004 | Bantz et al. | | 709/227 |
| 6,721,780 B1 * | 4/2004 | Kasriel et al. | | 709/203 |
| 6,757,683 B2 * | 6/2004 | Goodwin et al. | | 707/10 |

(Continued)

OTHER PUBLICATIONS

Globally progressive interactive web delivery; IEEE, vol. 3, Mar. 21-25, 1999.*

(Continued)

*Primary Examiner*—Thong Vu
(74) *Attorney, Agent, or Firm*—Paul W. Martin

(57) ABSTRACT

A method of downloading web content which downloads and stores web content at scheduled times. The method includes the steps of determining a number of web content addresses and corresponding download times, and downloading and storing web content at the web content addresses at the download times by the kiosk, before the kiosk displays any of the web content.

9 Claims, 3 Drawing Sheets

U.S. PATENT DOCUMENTS

| | | | |
|---|---|---|---|
| 6,763,458 B1 * | 7/2004 | Watanabe et al. | 713/100 |
| 6,769,019 B2 * | 7/2004 | Ferguson | 709/219 |
| 6,883,000 B1 * | 4/2005 | Gropper | 707/10 |
| 2001/0027481 A1 * | 10/2001 | Whyel | 709/218 |

OTHER PUBLICATIONS

Web Page Design and Download Time; www.cmg.org/downloads/JingZhi.pdf -.*

Replication and Synchronization Guide; http://manuals.sybase.com/onlinebooks/group-sas/awg0702e/dbrsen7/@Generic__BookTextView/7789.*

System Date and Time; www.stbernard.com/products/docs/ip35_adminguide/Chapter08.html.*

IST110 Web Page Usability Assignment; www.frankritter.com/ist110/example-usability.html.*

Image is Everything; renoir.vill.edu/~james/mikejames.html.*

Proxy Caching the Estimates Page Load Delays; www.cs.vt.edu/~chitra/docs/www6r.* timefetch-1.02; www.cpan.org/authors/id/J/JN/JNOLAN/timefetch-1.02.*

* cited by examiner

FIG. 2

| ADDRESS | DESCRIPTION | DATE | TIME |
|---------|-------------|------|------|
| ------- | ------------ | ----- | ----- |
| ------- | ------------ | ----- | ----- |
| ------- | ------------ | ----- | ----- |
| ------- | ------------ | ----- | ----- |
| ------- | ------------ | ----- | ----- |

— 38

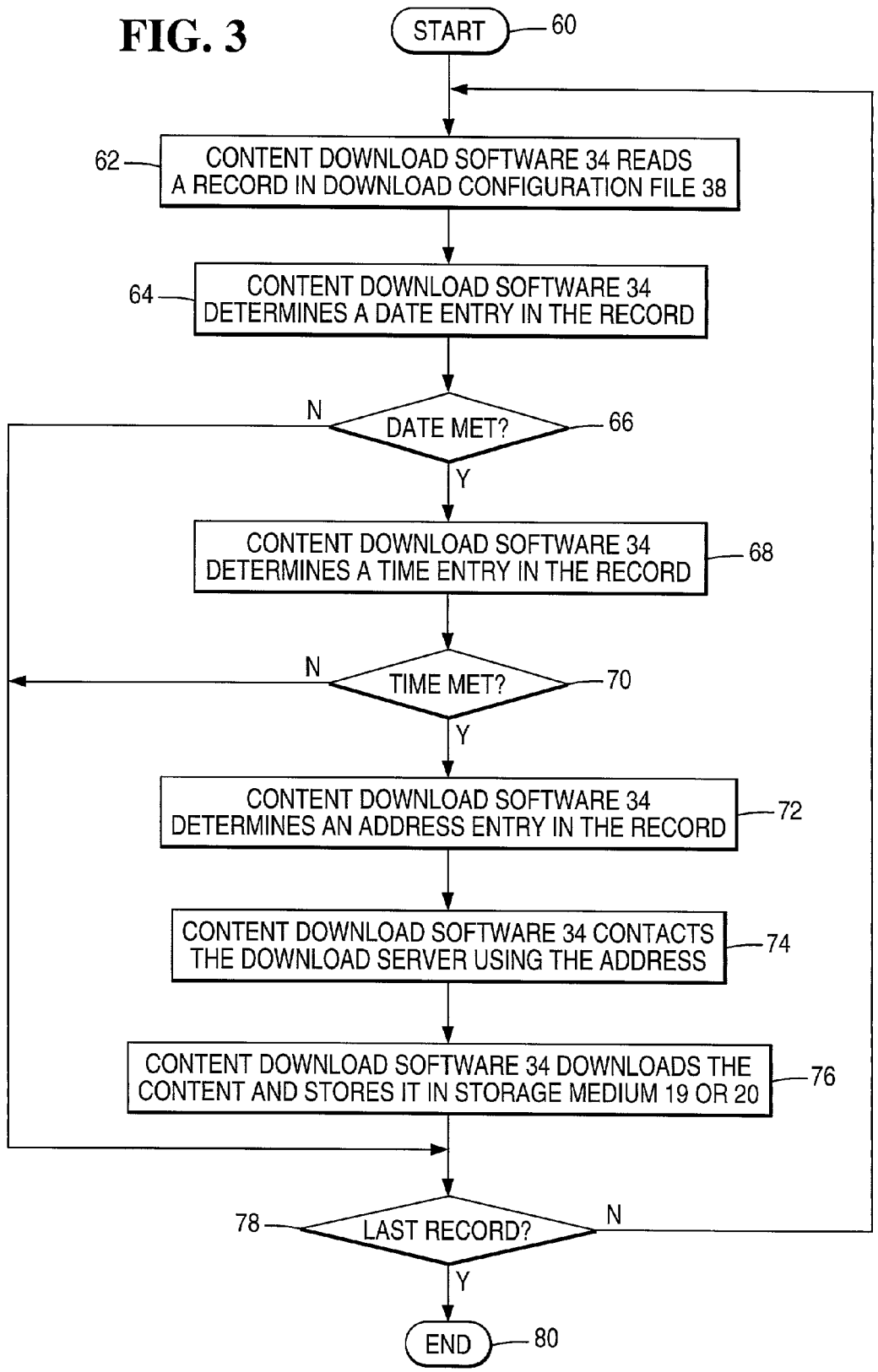

METHOD OF DOWNLOADING WEB CONTENT TO A NETWORK KIOSK IN ADVANCE

BACKGROUND OF THE INVENTION

The present invention relates to self-service kiosks and more specifically to a method of downloading web content to a network kiosk in advance.

Retailers have a desire to sell their products over networks, such as global networks which are a part of the World Wide Web (WWW or "web") and which use the Transmission Control Protocol/Internet Protocol (TCP/IP protocol). These retailers wish to provide Internet server web sites which offer the same features as Internet server web sites available to home shoppers who use their computers to connect to the Internet server web sites.

Kiosks provide a publicly-accessible computing platform for displaying web pages and other web-delivered content from retailer web sites. Kiosks may be located within a retailer's transaction establishment or elsewhere, such as in shopping malls. Kiosks may be easily networked to retailer web sites using the TCP/IP protocol. Web pages from web sites may be displayed using known and available web software, such as Microsoft® Internet Explorer software.

One problem with current global network service is bandwidth limitations. Bandwidth generally varies by type of connection, network usage levels, and time of day. Service problems are complicated by the fact that web pages differ in amount of content and web content differs in size. For example, a typical web page contains text, graphic images, and pointers or hypertext links to other web pages or content. However, web content may motion video files, which due to their size take significantly longer to download, even over high-speed or "T" series lines.

Various general methods of downloading web content are available today. Web browser software applications typically have the ability to store previously downloaded web content in temporary or cache files so that the same content need not be downloaded again the next time the web content is accessed. However, such methods are intended for general purpose operation and thus do not completely serve the needs of retailers. In particular, retailers do not want customers to walk away from their kiosks because web content is arriving to slowly.

Therefore, it would be desirable to provide a downloading method which relies on configuration information suited to the needs of retailers. It would also be desirable to provide a downloading method which can be configured by time of day.

SUMMARY OF THE INVENTION

In accordance with the teachings of the present invention, a method of downloading web content to a network kiosk in advance is provided.

The method includes the steps of determining a number of web content addresses and corresponding download times, and downloading and storing web content at the web content addresses at the download times by the kiosk, before the kiosk displays any of the web content.

It is accordingly an object of the present invention to provide a method of downloading web content to a network kiosk in advance.

It is another object of the present invention to download web content at scheduled times, before the kiosk displays any of the web content.

It is another object of the present invention to download web content at scheduled times, during a period of low kiosk usage.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a depiction of a download configuration file; and

FIG. 3 is a flow diagram illustrating the content downloading method of the present invention.

DETAILED DESCRIPTION OF THE PREFERRED EMBODIMENT

Figure 1:
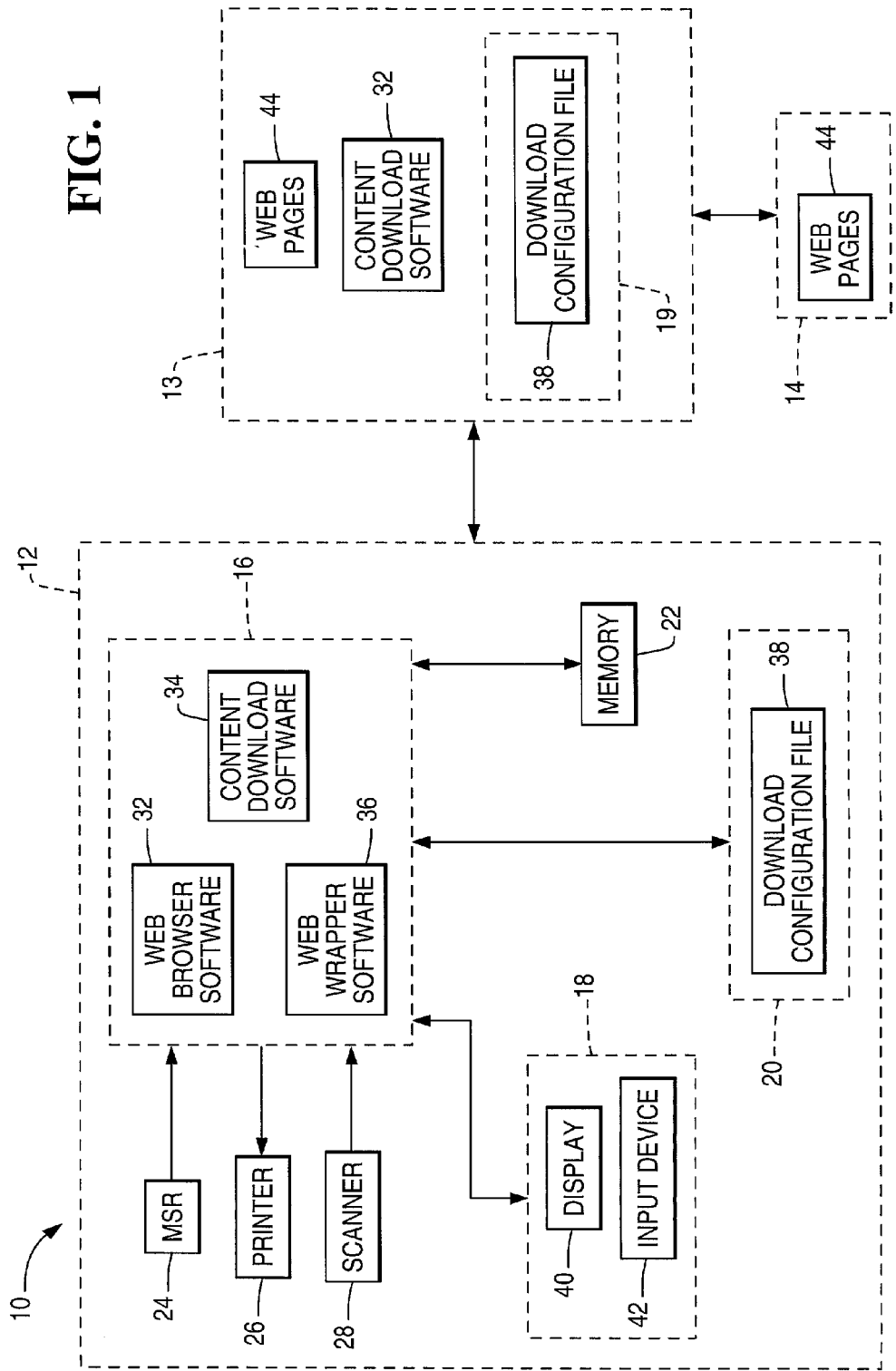
FIG. 1 is a block diagram of a transaction processing system including a network kiosk.

Turning now to FIG. 1, transaction system 10 includes kiosk 12, in-store server 13, and global network 14. Kiosk 12 is preferably located within a transaction establishment, such as a retail store, or transaction environment, such as a shopping mall. Kiosk 12 may include an NCR 7401 computer.

Kiosk 12 primarily includes processor 16, touch screen 18, memory 20, and storage medium 22. Kiosk 12 may additionally include a number of peripherals, including magnetic strip reader (MSR) 24, printer 26, and scanner 28.

To assist with execution of certain tasks performed by kiosk 12, kiosk 12 includes a built-in time keeping device, commonly referred to as a system clock, which is synchronized with current time, in order to automatically execute the tasks at their scheduled times.

Processor 16 controls operation of kiosk 12 and executes web browser software 32, content download software 34, and web wrapper software 36.

Web browser software 32 allows an operator to access information and purchase products from retailers through global network 14, which preferably includes World Wide Web (WWW or "web") servers. Web browser software 32 may include commercially-available web browser software, such as Microsoft® Internet Explorer web browser software. Microsoft® Internet Explorer web browser software is configured into a kiosk operation using a "-k" command line option. This option hides toolbars and menubars to prevent operator access to those functions.

Web browser software 32 retrieves and displays web pages 44 from in-store server 13 and/or global network 14. Global network 14 includes a plurality of interconnected servers. Web pages 44 include web pages which display information about products and services offered by the kiosk owner as well as other web pages. Web pages 44 assist operators to find information about products sold by the kiosk owner and to complete purchases of such products. For this purpose, web pages 34 may include a start or "home" page which operates as a default page from which operation begins and to which operation returns when an operator is finished using kiosk 12. Web pages 44 may be written using hypertext markup language (HTML) or other suitable web page language.

Content download software 34 downloads web content at scheduled times, including dates and times of day. Date and time of day information for each instance of web content may be coded into content download software 34 or listed in download configuration file 38 to allow a kiosk owner to control operation. Preferably, web content is downloaded during days and times of day when kiosk usage is low. Kiosk 12 stores download configuration file 38 in storage medium 20.

In-store server 13 may also execute content download software 34, particularly if server 13 is managing delivery of web content to kiosk 12. Server 13 may store its own download configuration file 38 in storage medium 19.

Web wrapper software 36 provides security functions. During operation, web wrapper software 36 prevents an operator from accessing kiosk files, other applications, the operating system software, or basic input-output system (BIOS) firmware, and prevents the operator from causing kiosk 12 to reboot.

Touch screen 18 includes display 40 and input device 42. Display 40 and input device 42 may also be separate units. Input device 42 may record personal information from an operator.

Memory 20 is used by processor 16 to store executed program information, including web wrapper software information.

MSR 24 reads loyalty, credit, debit, SMART, and/or other types of cards carried by an operator. MSR 24 may record personal information from an operator.

Printer 26 prints information from web wrapper software 32, including information on web pages 44 from network 14. For example, printer 26 may print information relevant to a transaction completed by an operator using kiosk 12.

Scanner 28 reads bar codes on products to obtain product identification numbers. Kiosk 12 queries a transaction server with the identification numbers to obtain information about the product and displays the information.

Figure 2:
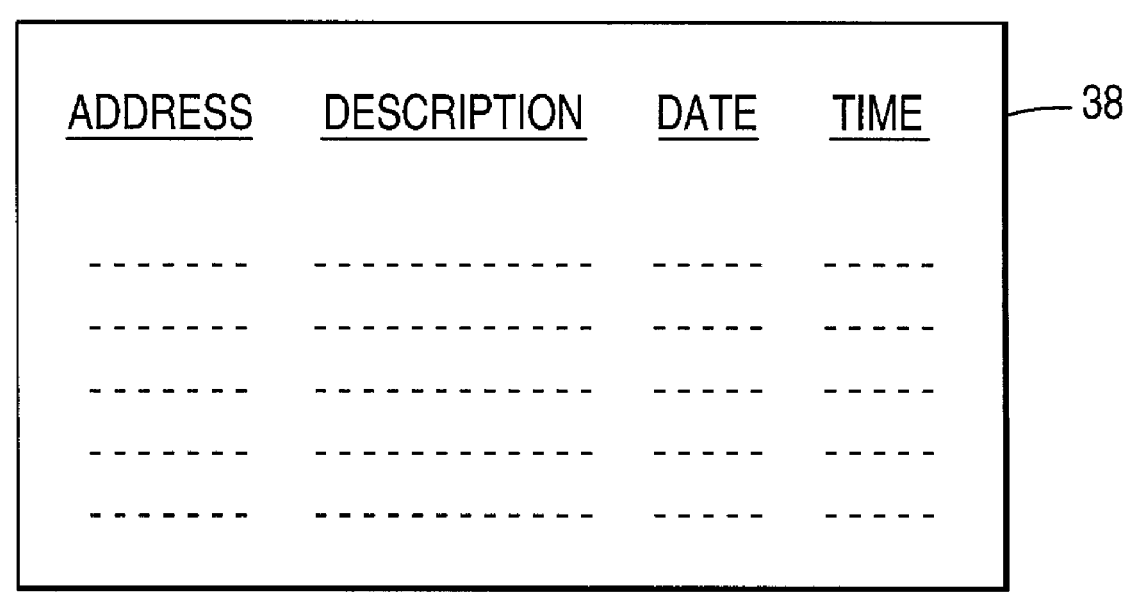

Turning now to FIG. 2, download configuration file 38 includes entries ADDRESS, DESCRIPTION, DATE, and TIME.

Entry ADDRESS identifies a particular address or Uniform Resource Locator (URL) for web content to be downloaded. Address information for kiosk-accessible web sites is obtained manually and inserted by the kiosk owner into download configuration file 38.

Entry DESCRIPTION describes the content to be downloaded, to assist a kiosk owner with management of web content. Content may include text, graphic images, video images, scripts, and other types of content.

Entry DATE identifies days on which the content is to be downloaded.

Entry TIME identifies times of day at which the content is to be downloaded. The download time is preferably a time when more bandwidth is available, such as late at night, or may be when kiosk 12 is not in use.

Configuration file 38 includes a minimum number of records, since errors would be likely in a comprehensive list of all web content. Use of configuration file 38 especially facilitates downloading of large media files.

In more detail, content download software 34 reads each record in download configuration file 38 to determine whether content must be downloaded and whether time information correspond to current dates and times of day information. Content download software 34 may be configured for scheduled downloading of web content in accordance with date and time of day information in download configuration file 38. Content download software 34 may be configured for manual downloading of web content in accordance with operator selections from download configuration file 38. Web browser software 32 obtains downloaded web content from storage medium 20 in a known manner before looking to global network 14.

Turning now to FIG. 3, the method of the present invention is illustrated beginning with START 60.

In step 62, content download software 34 reads a record in download configuration file 38.

In step 64, content download software 34 determines the date entry in the record.

In step 66, content download software 34 compares the date to a current date from the system clock. If the current date does not meet the date criteria, operation proceeds to step 78 to read the next address record. Otherwise, operation proceeds to step 68.

In step 68, content download software 34 determines the time of day entry in the record.

In step 70, content download software 34 compares the time of day to a current time of day from the system clock. If the current time of day does not meet the time criteria, operation proceeds to step 78 to read the next address record. Otherwise, operation proceeds to step 72.

In step 72, content download software 34 determines an address in the record.

In step 74, content download software 34 contacts the downloading server or web site in global network 14 where the information is located using the address.

In step 76, content download software 34 downloads the content and stores the content in storage medium 20 (or 19).

In step 78, content download software 34 determines whether the record is the last record. If so, operation ends at step 80. Otherwise, operation returns to step 62.

Advantageously, content download software 34 facilitates having web content available in advance of display of corresponding web pages. Web browser software 32 obtains downloaded web content from storage medium 20 in a known manner before looking to global network 14. For example, web browser software 32 records a selection of an address of a web page, reads web content identified in the web page which is located in storage medium 20, and displays the web page with the web content located in storage medium 20.

Although the present invention has been described with particular reference to certain preferred embodiments thereof, variations and modifications of the present invention can be effected within the spirit and scope of the following claims.

We claim:
1. A web content downloading method for a network kiosk associated with a store comprising the steps of:
   (a) storing a schedule from the store containing a number of web content addresses associated with web pages for assisting an operator to find information about products or services offered for sale by the store and to complete purchases of the products or services, and corresponding download times determined by the store by the kiosk, wherein the download times are chosen by the store to occur when the kiosk is not being used by the operator to select and browse the web pages;
   (b) waiting until the download times in accordance with the schedule by the kiosk; and
   (c) downloading and storing web content at the web content addresses at the download times in accordance with the schedule by the kiosk.
2. The method of claim 1, further comprising:
   (d) receiving the schedule from an in-store server by the kiosk.
3. The method of claim 1, wherein the web content comprises media files.

4. The method of claim 1, wherein the download times occur after store hours when the kiosk is without any operator.

5. A network kiosk associated with a store comprising:
a display; and
a computer which stores a schedule from the store containing a number of web content addresses associated with web pages for assisting an operator to find information about products or services offered for sale by the store and to complete purchases of the products or services, and corresponding download times determined by the store, wherein the download times are chosen by the store to occur when the kiosk is not being used by the operator to select and browse the web pages, for waiting until the download times in accordance with the schedule, and for downloading and storing web content at the web content addresses at the download times in accordance with the schedule.

6. The kiosk of claim 5, wherein the computer is also for receiving the schedule from an in-store server.

7. The kiosk of claim 5, wherein the web content comprises media files.

8. The kiosk of claim 5, wherein the download times occur after store hours when the kiosk is without any operator.

9. A web content downloading method for a network kiosk associated with a store comprising the steps of:

(a) recording a number of web content addresses associated with web pages for assisting an operator to find information about products or services offered for sale by the store and to complete purchases of the products or services, and corresponding download times determined by the store by a computer associated with the store, wherein the download times are chosen by the store to occur when the kiosk is not being used by the operator to select and browse the web pages;

(b) downloading the schedule to the kiosk by the computer;

(c) waiting until the download times in accordance with the schedule by the kiosk;

(d) connecting with servers at the web content addresses at the download times in accordance with the schedule, and downloading and storing web content at the web content addresses by the kiosk; and (e) providing stored web content upon selection of the web pages by the operator by the kiosk.

* * * * *